(12) United States Patent
Hsu et al.

(10) Patent No.: US 12,425,429 B2
(45) Date of Patent: Sep. 23, 2025

(54) SYSTEMS AND METHODS FOR APPLYING UNFAIR THROTTLING TO SECURITY SERVICE REQUESTS

(71) Applicant: Fortinet, Inc., Sunnyvale, CA (US)

(72) Inventors: Chun Hsu, Bellevue, WA (US); Chris Gorecki, Seattle, WA (US)

(73) Assignee: Fortinet, Inc., Sunnyvale, CA (US)

( * ) Notice: Subject to any disclaimer, the term of this patent is extended or adjusted under 35 U.S.C. 154(b) by 265 days.

(21) Appl. No.: 18/126,091

(22) Filed: Mar. 24, 2023

(65) Prior Publication Data

US 2024/0333731 A1    Oct. 3, 2024

(51) Int. Cl.
  *G06F 9/50*    (2006.01)
  *G06F 11/34*   (2006.01)
  *H04L 9/40*    (2022.01)

(52) U.S. Cl.
  CPC ........ *H04L 63/1425* (2013.01); *G06F 9/5005* (2013.01); *G06F 9/505* (2013.01); *G06F 11/3433* (2013.01); *H04L 63/0807* (2013.01); *H04L 63/102* (2013.01); *H04L 63/1416* (2013.01); *G06F 2209/5018* (2013.01); *G06F 2209/504* (2013.01); *G06F 2209/506* (2013.01)

(58) Field of Classification Search
  CPC .... G06F 9/5083; G06F 9/5005; G06F 3/0659; G06F 9/505; G06F 9/50; H04L 47/525; H04L 47/52; H04L 47/528
  See application file for complete search history.

(56) References Cited

U.S. PATENT DOCUMENTS

| | | | |
|---|---|---|---|
| 2011/0314145 A1* | 12/2011 | Raleigh ................... | H04L 63/08 709/224 |
| 2021/0240536 A1* | 8/2021 | Brazeau ................ | G06F 9/5027 |
| 2022/0239971 A1* | 7/2022 | Bogatin .................. | H04W 4/06 |
| 2022/0303881 A1* | 9/2022 | Menon .............. | H04W 28/0858 |
| 2022/0368747 A1* | 11/2022 | Menon ................. | H04H 20/423 |

FOREIGN PATENT DOCUMENTS

| CN | 111221535 A | * | 6/2020 | ............... G06F 8/41 |
|---|---|---|---|---|
| CN | 117278562 A | * | 12/2023 | |

OTHER PUBLICATIONS

David Yanacek, "Fairness in multi-tenant systems" (Year: 2020), obtained online from <https://aws.amazon.com/builders-library/fairness-in-multi-tenant-systems/>, retrieved on Feb. 8, 2025.*
"YARN—The Capacity Scheduler", Dec. 21, 2017, obtained online from <https://www.cloudera.com/blog/technical/yarn-capacity-scheduler.html>, retrieved on May 21, 2025. (Year: 2017).*

* cited by examiner

*Primary Examiner* — Zhimei Zhu
(74) *Attorney, Agent, or Firm* — Jaffery Watson Hamilton & DeSanctis LLP (57) ABSTRACT

Various embodiments provide systems and methods for granting/denying access to network security services to a plurality of service requesters.

8 Claims, 6 Drawing Sheets

SYSTEMS AND METHODS FOR APPLYING UNFAIR THROTTLING TO SECURITY SERVICE REQUESTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2023, Fortinet, Inc.

FIELD

Embodiments discussed generally relate to systems and methods for providing services to a plurality of service requesters, and more particularly to systems and methods for granting/denying access to network security services to a plurality of service requesters.

BACKGROUND

Computers and computer networks are subject to a number of different types of attacks leading to development of machines and software to mitigate and in some cases prevent such attacks. In some cases, off-network services are provided that allow a network administrator to obtain detailed information about network activity. Such off-network services are available to a number of network administrators where one or more network administrators may use a disproportionate amount of the service capacity at the expense of other requesters. To prevent this, off-network services limit requesters to a volume of service that they have paid for, thus avoiding the situation where some requesters overuse the system to the detriment of other users. Such an approach, however, often underutilizes the service.

Accordingly, there is a need in the art for advanced systems and methods for controlling access to an off-network service.

SUMMARY

Various embodiments provide systems and methods for granting/denying access to network security services to a plurality of service requesters.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for granting/denying access to network security services to a plurality of service requesters.

Some embodiments discussed herein provide effective systems and/or methods for providing security services to a plurality of requesters using an unfair throttling approach. In some embodiments, such an unfair throttling approach allows for access to the security services based at least in part on a combination of a total number of subscribers to the security services, and the total number of concurrent threads currently used by a specific requester. In various embodiments, such an unfair throttling approach further allows for denial of unfair throttling to a subset of the subscribers and/or a variance of unfair throttling available across the subscribers.

In some embodiments, the security services include a network detect and respond service that exposes functionality through an application programming interface (API). Via this API, many subscribers are allowed access to the security services offered. Generally when a subscriber requests access to the service the request is granted and the service performed. Such services may take milliseconds to perform up to several minutes to perform. Further, the number of requests received can vary greatly across subscribers with some requesting only an occasional service, while others issue hundreds of requests per hour. The variance in both the time it can take to perform a requested service and the number of subscribers issuing requests at a given time complicates system utilization. At one end of the spectrum would be an approach that simply takes requests as they are received and grants them if there is an available thread. Such an approach assures that the system is fully utilized, but results in many subscribers being denied access because of the overuse by some subscribers. At the other end, each subscriber is allowed only their fair share of the system. Such an approach guarantees every subscriber access, but also results in a low utilization of the service do to the low rate of usage by some subscribers. Some embodiments discussed herein provide a balance between these extremes by promoting unfair distribution for at least some subset of the subscribers, while at the same time protecting immediate access for a low usage subscriber.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FOR- TISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The term "subscriber" is used in its broadest sense to mean a user or entity that is authorized to access a service provider. Based upon the disclosure provided herein, one of ordinary skill in the art will recognize a variety of subscribers that may interact with different embodiments discussed herein.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide systems for providing a network service to a plurality of subscribers. The systems include a processing resource and a non-transitory computer-readable medium coupled to the processing resource. The non-transitory computer-readable medium has stored therein instructions that when executed by the processing resource cause the processing resource to receive a first request to perform a first network service from a first subscriber at a first time, a second request to perform a second network service from the second subscriber at a second time, and a third request to perform a third network service from a second subscriber at a third time. The rate at which the first request, the second request, and the third request are received is at least ten per second. The non-transitory computer-readable medium has stored therein instructions that when executed by the processing resource cause the processing resource to: identify the first subscriber and the second subscriber; calculate a maximum number of threads usable by the first subscriber corresponding to the first time; calculate a maximum number of threads usable by the first subscriber corresponding to the second time; calculate a maximum number of threads usable by the second subscriber corresponding to the third time; grant the first request based at least in part on the maximum number of threads usable by the first subscriber corresponding to the first time; and process the first request.

In some instances of the aforementioned embodiments where the first time precedes the second time, and the maximum number of threads usable by the first subscriber corresponding to the second time is less than the maximum number of threads usable by the first subscriber corresponding to the first time in part because of the grant of the first request, the non-transitory computer-readable medium further has stored therein instructions that when executed by the processing resource cause the processing resource to deny the second request based at least in part on the maximum number of threads usable by the first subscriber corresponding to second first time.

In various instances of the aforementioned embodiments where the third time precedes the second time, the non-transitory computer-readable medium further having stored therein instructions that when executed by the processing resource cause the processing resource to: grant the third request based at least in part on the maximum number of threads usable by the second subscriber corresponding to the third time; process the third request; and deny the second request based at least in part on the maximum number of threads usable by the first subscriber corresponding to second first time. The maximum number of threads usable by the first subscriber corresponding to the second time is less than the maximum number of threads usable by the first subscriber corresponding to the first time in part because of the grant of the third request. In some such instances, processing the first request continues until after processing the third request has completed.

In various cases, calculating the maximum number of threads usable by the third subscriber corresponding to the third time includes adding a first variable to a second variable. The first variable varies as a function of a total number of subscribers and the second variable varies as a function of a total amount of capacity currently used by all of the subscribers. In some such cases, the first variable is a total amount of capacity divided by the total number of subscribers, and the second variable is a total capacity less the total amount of capacity currently used by all of the subscribers multiplied by a multiplication factor. In some cases where the multiplication factor is a first multiplication factor, calculating the maximum number of threads usable by the second subscriber corresponding to the second time includes adding the first variable to a third variable, where the third variable is the total capacity less the total amount of capacity currently used by all of the subscribers multiplied by a second multiplication factor, and the second multiplication factor is different from the first multiplication factor.

Other embodiments provide methods for providing a network service to a plurality of subscribers. The methods include receiving, by a processing resource, a first request to perform a first network service from a first subscriber at a first time, a second request to perform a second network service from the second subscriber at a second time, and a third request to perform a third network service from a second subscriber at a third time. The rate at which the first request, the second request, and the third request are received is at least ten per second. The methods further include: identifying, by the processing resource, the first subscriber and the second subscriber; calculating, by the processing resource, a maximum number of threads usable by the first subscriber corresponding to the first time; calculating, by the processing resource, a maximum number of threads usable by the first subscriber corresponding to the second time; calculating, by the processing resource, a maximum number of threads usable by the second subscriber corresponding to the third time; granting, by the processing resource, the first request based at least in part on the maximum number of threads usable by the first subscriber corresponding to the first time; and processing, by the processing resource, the first request.

Yet other embodiments provide non-transitory computer-readable media. The non-transitory computer readable media have stored therein instructions that when executed by a processing resource cause the processing resource to perform a method comprising: receiving a first request to perform a first network service from a first subscriber at a first time, a second request to perform a second network service from the second subscriber at a second time, and a third request to perform a third network service from a second subscriber at a third time. The third time precedes the second time, and rate at which the first request, the second request, and the third request are received is at least ten per second. The method further includes: identifying the first subscriber and the second subscriber; calculating a maximum number of threads usable by the first subscriber corresponding to the first time; calculating a maximum number of threads usable by the first subscriber corresponding to the second time; calculating a maximum number of threads usable by the second subscriber corresponding to the third time; granting the first request based at least in part on the maximum number of threads usable by the first subscriber corresponding to the first time; and processing the first request; granting the third request based at least in part on the maximum number of threads usable by the second subscriber corresponding to the third time; processing the third request; and denying the second request based at least in part on the maximum number of threads usable by the first subscriber corresponding to second first time. The maximum number of threads usable by the first subscriber corresponding to the second time is less than the maximum number of threads usable by the first subscriber corresponding to the first time in part because of the grant of the third request.

Figure 1A:
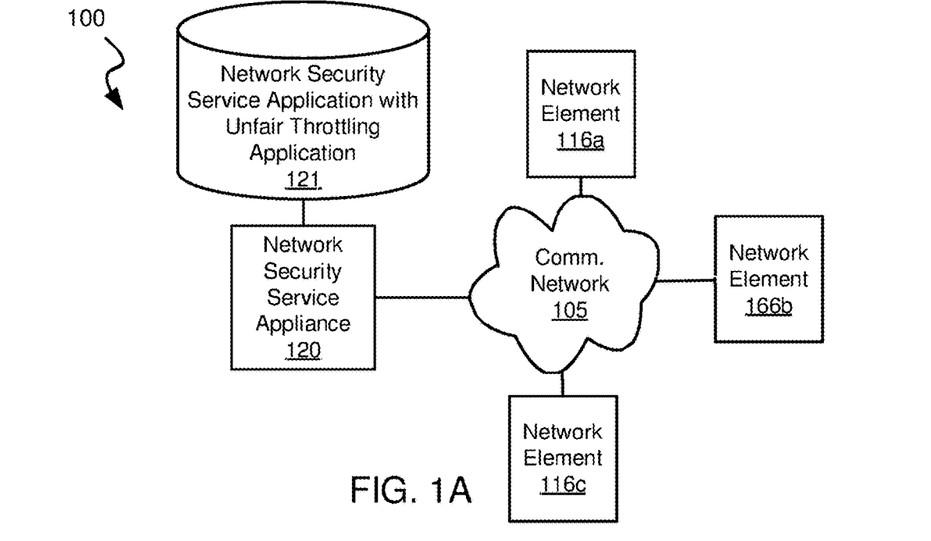
FIGS. 1A-1D illustrate a network architecture including a network security service appliance configured to provide network security services to a plurality of requesters using an unfair throttling approach in accordance with some embodiments.

Turning to FIG. 1A, network architecture 100 is shown that includes a network security service appliance 120 configured to provide network security services to a plurality of requesters using an unfair throttling approach in accordance with some embodiments. Network security service appliance 120 may be either a physical machine or a virtual machine that is capable of receiving a request for a network security service, processing the received request, and issuing a response. In some embodiments, network security service appliance 120 provides an API through which one or more services may be requested and a response received.

Network security service appliance 120 executes a network security application 121 that causes it to do the receiving of requests, processing requests, and responding to requests discussed above. In addition, executing network security application 121 that causes network security service appliance 120 to perform an unfair throttling approach to granting/denying requests. The approach implemented may be, for example, one of those discussed below in relation to FIGS. 2-4.

Network security service appliance 120 is accessible via a communication network 105. Communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Subscribers access network security service appliance 120 by issuing requests from a network element 116 (e.g., one of network element 116a, network element 116b, network element 116c). A request is issued from a subscriber using a respective network element 116. In turn, network security service appliance 120 either declines or grants the request. Where a request is granted, network security service appliance 120 returns a response to the respective network element 116.

Figure 1B:
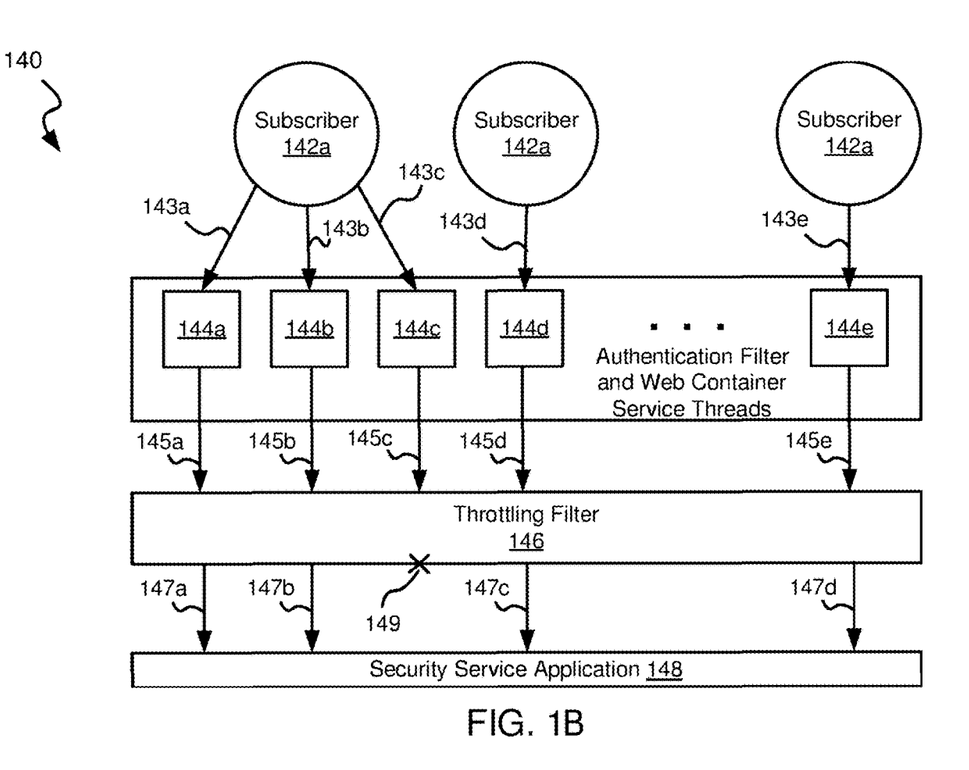

Turning to FIG. 1B, a block diagram 140 illustrates the operational process of network security service appliance 120. As shown, network security service appliance 120 receives a number of requests 143 (i.e., a request 143a from a subscriber 142a, a request 143b from a subscriber 142a, a request 143c from a subscriber 142a, a request 143d from a subscriber 142b, and a request 143e from a subscriber 142c). Notably, subscriber 142a is requesting significantly more than either of subscriber 142b or subscriber 142c.

As requests 143 are received the respective subscriber 142 making the request is authenticated. This may be any form of authentication configured to identify the requesting subscriber and determine if they are authorized to access network security service appliance 120. This includes opening a service thread 144 (i.e., a service thread 144a corresponding to request 143a, a service thread 144b corresponding to request 143b, a service thread 144c corresponding to request 143c, a service thread 144d corresponding to request 143d, a service thread 144c corresponding to request 143e).

The advent of the respective service threads 144 are communicated to a throttling filter 146 along with an indication of the requesting subscriber 142 (shown as lines 145a-145e). In some embodiments, the authentication filter performs a token lookup, and passes the information from the token lookup to throttling filter 146. Throttling filter 146 tracks the number of concurrent service threads 144 open for each of subscribers 142. This includes incrementing the number of concurrent threads as a new request is received and decrementing the number of concurrent threads as requests are completed either through denial or completion of processing. If a subscriber runs a script that attempts to use too many concurrent requests, it would immediately be throttled based on the token itself. On the other hand, a subscriber attempting to use multiple tokens to bypass the throttle would be identified very quickly once the tokens are resolved.

Where throttling filter 146 determines that a request 143 has been received from a respective subscriber 142 that has not yet exceeded their variable concurrent request allotment, throttling filter 146 forwards the request 143 to a security service application 148 as indicated by: line 147a corresponding to request 143a, line 147b corresponding to request 143b, line 147c corresponding to request 143d, and line 147d corresponding to request 143e. In turn, security service application 148 performs the requested security service and returns a results to the subscriber 142 that made the corresponding request 143. Alternatively, where throttling filter 146 determines that a request 143 has been received from a respective subscriber 142 that has exceeded their variable concurrent request allotment, throttling filter 146 denies the request as indicated by X 149 corresponding to request 143c, and the corresponding service thread 144c is closed.

Figure 1C:
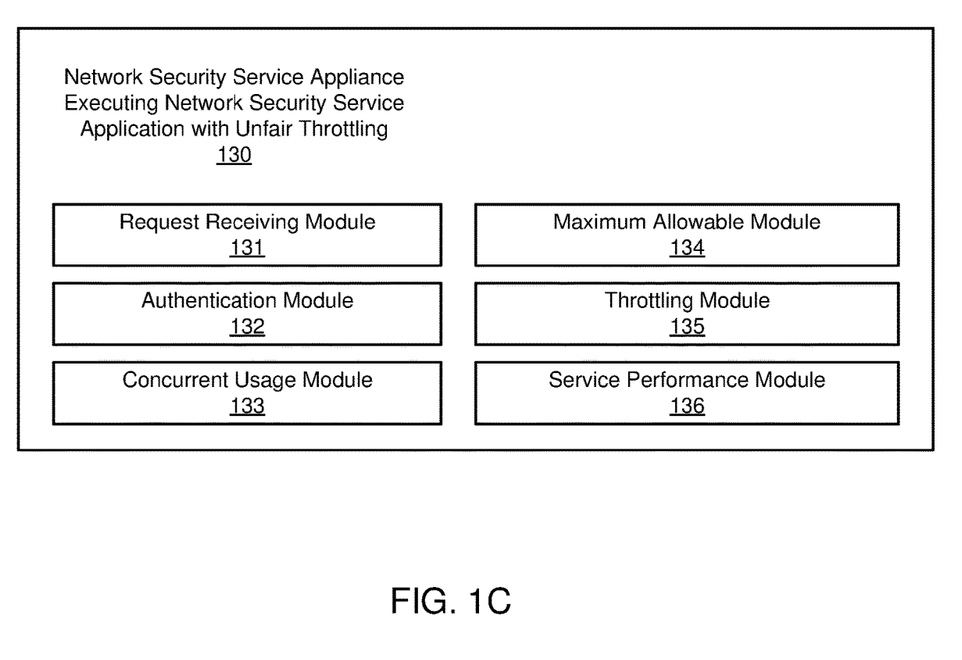

Turning to FIG. 1C, an example implementation of a network security service appliance executing a network security service application with unfair throttling 130 (e.g., network security service appliance 120 executing network security application 121 with unfair throttling) is shown in accordance with some embodiments. As shown in this example, network security service appliance executing a network security service application with unfair throttling 130 includes: a request receiving module 131, an authentication module 132, a concurrent usage module 133, a maximum allowable module 134, a throttling module 135, and a service performance module 136.

Request receiving module 131 is configured to determine whether a request has been received. In embodiments where requests are received from subscribers via an API, request receiving module 131 monitors network messages for a message that is a request in accordance with the API. Based upon the disclosure provided herein, one of ordinary skill in the art will recognize a variety of processes that may be used to receive messages, and corresponding processes for identifying receipt of such messages.

Authentication module 132 is configured to authenticate a user associated with a received request and as part of the authentication to identify the particular subscriber associated with the received request. In some embodiments, this authentication process involves a token lookup using a bearer token passed as part of a hypertext transfer protocol (HTTP) header that is translated by an API. In some cases, the identity of the user is resolved with an external lookup to a centralized authentication service. Based upon the disclosure provided herein, one of ordinary skill in the art will recognize a variety of authentication processes that may be used in relation to different embodiments.

Concurrent usage module 133 is configured to determine the number of concurrent threads currently associated with the specific requester. In some embodiments, this involves identifying all current threads associated with the token (as in the case of a request including a script of a number of threads), or in the case where a subscriber has used multiple tokens (as in the case where the subscriber has issued a number of separate requests) identifying all current threads associated with a user identified by resolving the multiple tokens. In addition, concurrent usage module 133 is configured to increment the number of threads concurrently used by the specific subscriber when a request is granted, and to decrement the number of threads concurrently used by the specific subscriber when a process associated with a previously granted request completes. Based upon the disclosure provided herein, one of ordinary skill in the art will recognize a variety of processes that may be used to determine the number of concurrent threads associated with the specific requester.

Maximum allowable module 134 is configured to determine a number of fair threads per requester. In some embodiments, the number of fair threads per requester is calculated as the total number of threads that can be concurrently serviced divided by the total number of subscribers. Further, maximum allowable module 134 is configured to determine a number of free allowed threads that may be used by any given requester. In some embodiments, the number of free allowed threads that may be used by any given subscriber is a function of how many of the total number of threads that can be concurrently serviced less those threads that are currently used. Said another way, the number of free allowed threads is the total number of unused threads, which varies over time based upon usage of other subscribers. In one particular embodiment, the number of free allowed threads is the total number of unused threads that may be used by any given subscriber is fifty-percent (50%) of the total number of unused threads. It is noted that in some embodiments the number of free allowed threads changes each time a request is granted and each time a process corresponding to a request completes, and as such the number of free allowed threads can change tens, hundreds, or more times per second. Based upon the disclosure provided herein, one of ordinary skill in the art will recognize other percentages of the total number of unused threads that may be used by a given user in accordance with different embodiments. Additionally, maximum allowable module 134 adds the number of free allowed threads is added to the number of fair threads to yield a total number of threads that can be concurrently used by the subscriber at the current time. Again, as the total number of unused threads varies as a function of the number of threads used by other subscribers, the total number of threads that can be concurrently used by a given subscriber at the current time varies.

Throttling module 135 is configured to determine if the number of concurrent threads associated with the specific requester exceeds the total number of threads that can be concurrently used by the specific subscriber. In addition, throttling module 135 is configured to grant the request where the concurrent threads associated with the specific requester has not exceeded the total number of threads; and to deny the request where the concurrent threads associated with the specific requester has exceeded the total number of threads.

Service performance module 136 is configured to perform the requested service where the request is granted by throttling module 135. As an example, a request may be for the number of incidents occurring in a network over defined time-frame. Based upon the disclosure provided herein, one of ordinary skill in the art will recognize a variety of requests that may be made in relation to different embodiments.

Figure 1D:
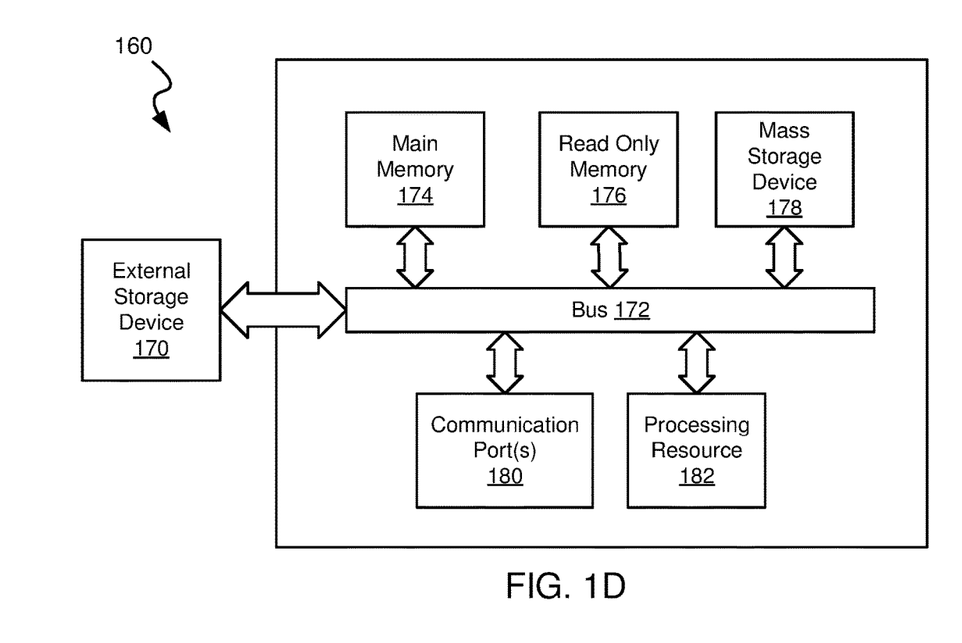

Turning to FIG. 1D, an example computer system 160 is shown in which or with which embodiments of the present disclosure may be utilized. As shown in FIG. 1D, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure. A computer system similar to that discussed in relation to FIG. 1D may be used to implement network security appliance 110 and/or network behavior observation appliance 120.

Figure 2A:
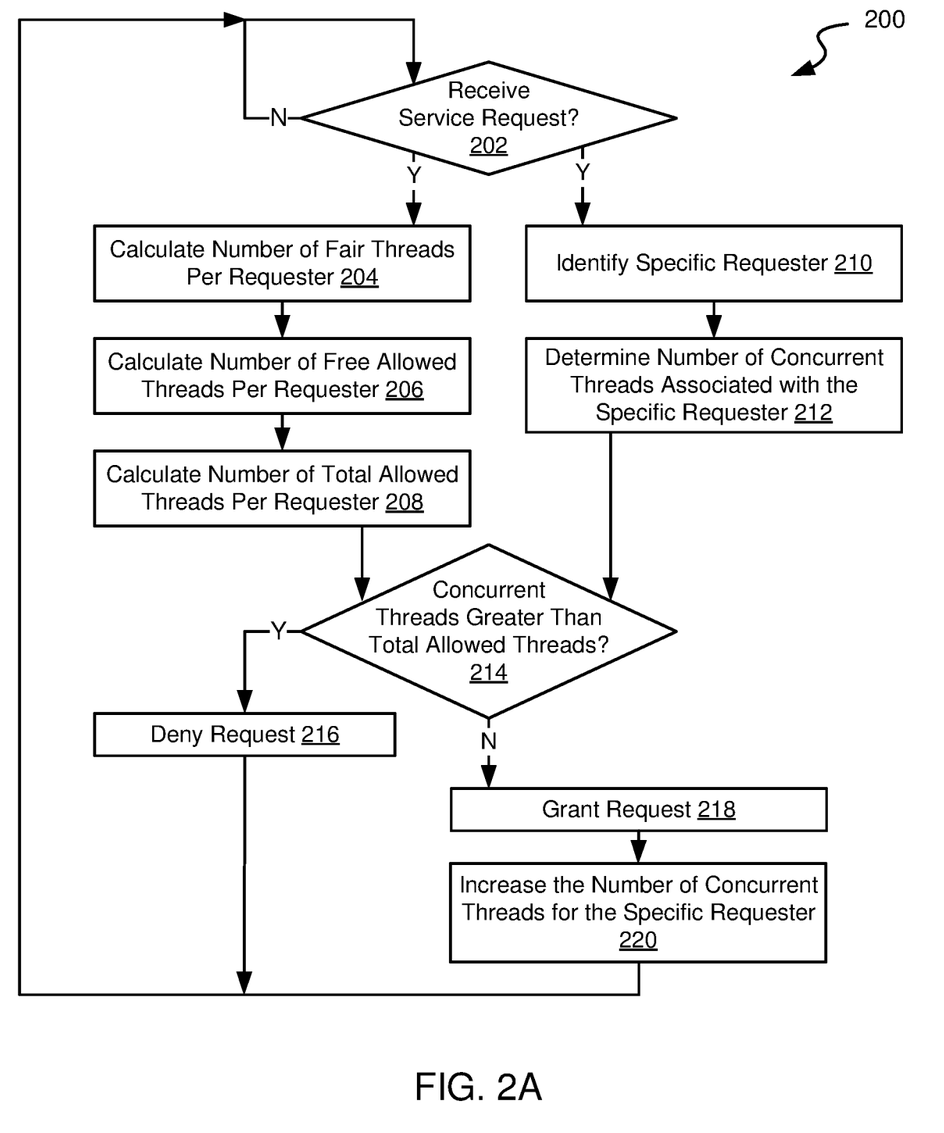
FIGS. 2A-2B is a flow diagram showing a method in accordance with some embodiments for servicing requests using an unfair throttling approach.
Figure 2B:
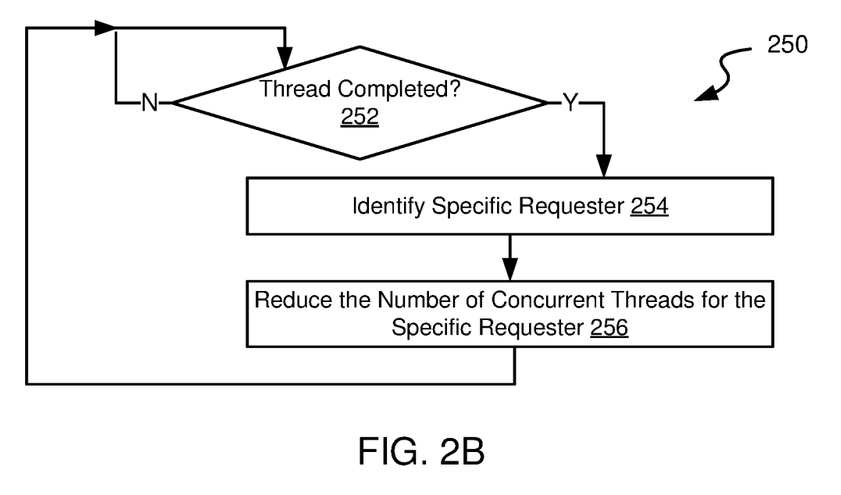

Turning to FIGS. 2A-2B, flow diagrams 200, 250 shows a method in accordance with some embodiments for servicing requests using an unfair throttling approach. Turning to FIG. 2A and following flow diagram 200, it is determined whether a request has been received (block 202). In some embodiments, requests are received from subscribers via an API, and determining that such a request has been received involves monitoring network messages for a message that is a request. Based upon the disclosure provided herein, one of ordinary skill in the art will recognize a variety of processes that may be used to receive messages, and corresponding processes for identifying receipt of such messages.

Where a request has been received (block 202), an authentication process is performed to identify the specific requester (block 210). In some embodiments, this authentication process involves a token lookup using a barer token passed as part of a hypertext transfer protocol (HTTP) header that is translated by an API. In some cases, the identity of the user is resolved with an external lookup to a centralized authentication service. Based upon the disclosure provided herein, one of ordinary skill in the art will recognize a variety of authentication processes that may be used in relation to different embodiments. In addition, the number of concurrent threads currently associated with the specific requester is determined (block 212). In some embodiments, this involves identifying all current threads associated with the token (as in the case of a request including a script of a number of threads), or in the case where a subscriber has used multiple tokens (as in the case where the subscriber has issued a number of separate requests) identifying all current threads associated with a user identified by resolving the multiple tokens. Based upon the disclosure provided herein, one of ordinary skill in the art will recognize a variety of processes that may be used to determine the number of concurrent threads associated with the specific requester.

Additionally, a number of fair threads per requester is calculated (block 204). In some embodiments, the number of fair threads per requester is calculated as the total number of threads that can be concurrently serviced divided by the total number of subscribers. Further, the number of free allowed threads that may be used by any given requester is calculated (block 206). In some embodiments, the number of free allowed threads that may be used by any given subscriber is a function of how many of the total number of threads that can be concurrently serviced less those threads that are currently used. Said another way, the number of free allowed threads is the total number of unused threads, which varies over time based upon usage of other subscribers. In one particular embodiment, the number of free allowed threads is the total number of unused threads that may be used by any given subscriber is fifty-percent (50%) of the total number of unused threads. It is noted that in some embodiments the number of free allowed threads changes each time a request is granted and each time a process corresponding to a request completes, and as such the number of free allowed threads can change tens, hundreds, or more times per second. Based upon the disclosure provided herein, one of ordinary skill in the art will recognize other percentages of the total number of unused threads that may be used by a given user in accordance with different embodiments.

Using the embodiment where the number of free allowed threads is the total number of unused threads that may be used by any given subscriber is fifty-percent (50%) and assuming that the total number of subscribers is one thousand (1000) and the total number of threads is one thousand (1000), a given subscriber may be able to use up to five-hundred (500) of the one thousand (1000) threads when they are the only subscriber accessing the system (i.e., where the total number of unused threads is nine-hundred, ninety-nine (999)). One the other end of the spectrum, that same subscriber is only allowed to use one (1) thread where all subscribers are requesting two (2) or more threads (i.e., where the total number of unused threads drops to zero (0)). Thus, any given subscriber is allowed to make a tremendous number of requests when the system is lightly loaded. This is especially useful for automated scripts that run in the middle of the night. At the same time, a significant number of threads are maintained available for requests received from other subscribers. There is some possibility that where a large number of requests from other subscribers are simultaneously received at a time when other subscribers are unfairly granted access to threads that a request from a subscriber that has not even exceeded their fair threads can be rejected. However, such a possibility is remote and resolves as soon as one of the currently executing threads completes.

The number of free allowed threads is added to the number of fair threads to yield a total number of threads that can be concurrently used by a given subscriber at the current time (block 208). Again, as the total number of unused threads varies as a function of the number of threads used by other subscribers, the total number of threads that can be concurrently used by a given subscriber at the current time varies.

The number of concurrent threads associated with the specific requester (block 212) is compared with the total number of threads (block 208) that can be concurrently used by the specific subscriber to determine whether the specific subscriber has exceeded their maximum number of threads (block 214). Where the concurrent threads associated with the specific requester (block 212) has not exceeded the total number of threads (block 208)(block 214), the request by the specific subscriber is granted (block 218). As part of granting the request, the request is processed resulting in a response to the specific subscriber. As an example, a request may be for the number of incidents occurring in a network over defined time-frame. Based upon the disclosure provided herein, one of ordinary skill in the art will recognize a variety of requests that may be made in relation to different embodiments. The number of threads concurrently used by the specific subscriber is incremented (block 220).

Otherwise, where the concurrent threads associated with the specific requester (block 212) has exceeded the total number of threads (block 208)(block 214), the request is denied (block 216).

Such an approach to throttling offers an ability to handle requests from subscribers that were not expected or known prior to receiving the request. The identity of the subscriber is resolved with an external lookup to a centralized authentication service. Therefore, the throttling mechanism doesn't necessarily know the subscriber's identity, especially if a bearer token used for authentication is invalid.

As mentioned above, the processing of such requests may take milliseconds to perform up to several minutes to perform, and as such the decrementing of the number of threads concurrently used by the specific subscriber is done asynchronously as performance of the service indicated in the request is completed. Turning to FIG. 2B, a flow diagram 250 shows a method in accordance with some embodiments for decrementing the number of threads concurrently used by the specific subscriber. Following flow diagram 250, it is determined whether a request corresponding to a thread has completed (block 252). Such a determination can be made, for example, by a process flagging a completion coincident to the process reporting its results to a requesting subscriber. Based upon the disclosure provided herein, one of ordinary skill in the art will recognize a variety of approaches to determining thread completion that may be used in relation to different embodiments.

Where a request corresponding to a thread has completed (block 252), the specific requester who originally requested the service associated with the thread is identified (block 254). In some embodiments, each thread includes an identification of the specific requester, and in such embodiments identifying the specific requester merely includes accessing such information associated with the thread. The number of threads concurrently used by the specific subscriber is then decremented (block 256).

Figure 3:
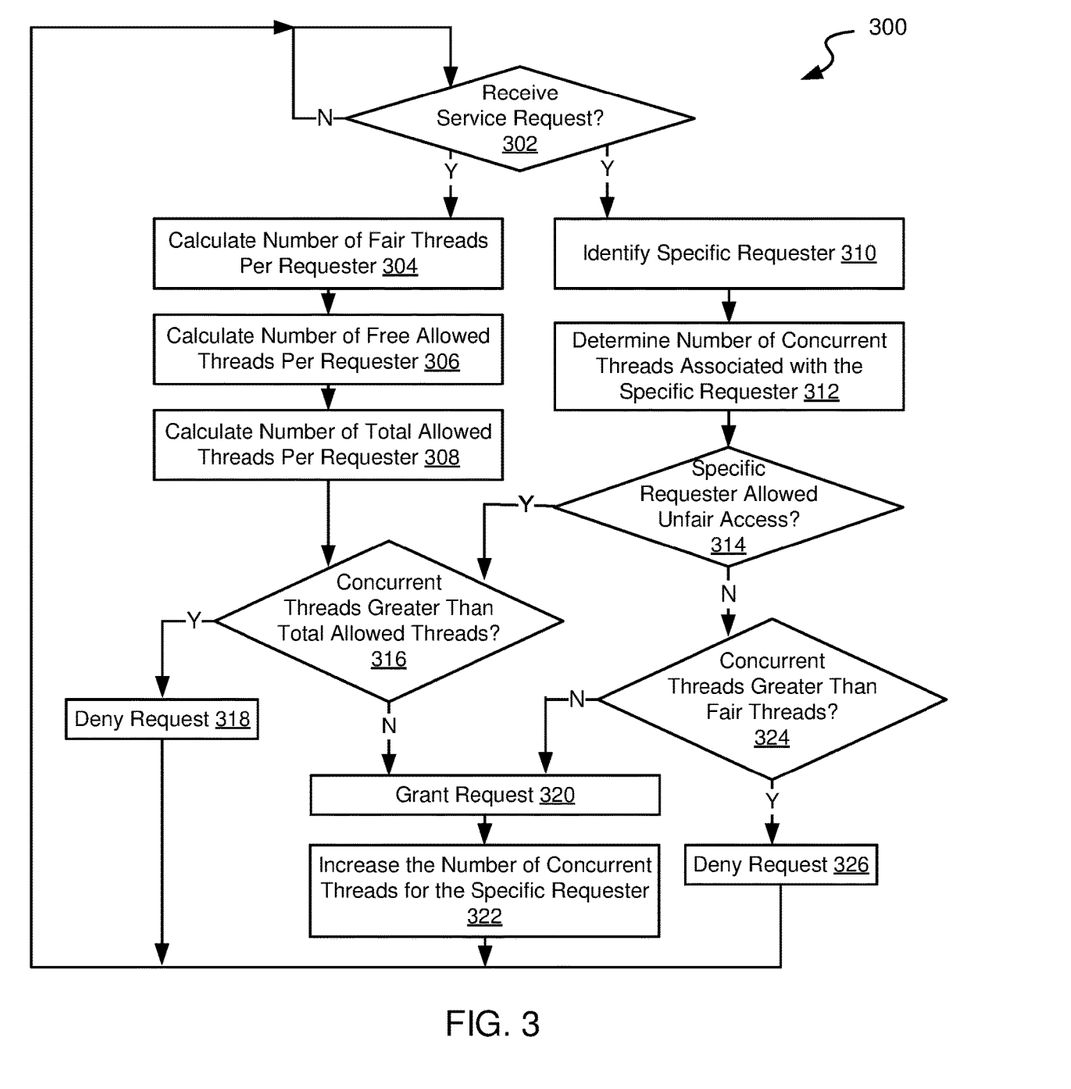
FIG. 3 is a flow diagram showing a method in accordance with various embodiments for servicing requests using another unfair throttling approach.

Turning to FIG. 3, a flow diagram 300 shows a method in accordance with other embodiments for servicing requests using another unfair throttling approach. Following flow diagram 300, it is determined whether a request has been received (block 302). In some embodiments, requests are received from subscribers via an API, and determining that such a request has been received involves monitoring network messages for a message that is a request. Based upon the disclosure provided herein, one of ordinary skill in the art will recognize a variety of processes that may be used to receive messages, and corresponding processes for identifying receipt of such messages.

Where a request has been received (block 302), a number of fair threads per requester is calculated (block 304). In some embodiments, the number of fair threads per requester is calculated as the total number of threads that can be concurrently serviced divided by the total number of subscribers. Further, the number of free allowed threads that may be used by any given requester is calculated (block 306). In some embodiments, the number of free allowed threads that may be used by any given subscriber is a function of how many of the total number of threads that can be concurrently serviced less those threads that are currently used. Said another way, the number of free allowed threads is the total number of unused threads, which varies over time based upon usage of other subscribers. In one particular embodiment, the number of free allowed threads is the total number of unused threads that may be used by any given subscriber is fifty-percent (50%) of the total number of unused threads. It is noted that in some embodiments the number of free allowed threads changes each time a request is granted and each time a process corresponding to a request completes, and as such the number of free allowed threads can change tens, hundreds, or more times per second. Based upon the disclosure provided herein, one of ordinary skill in the art will recognize other percentages of the total number of unused threads that may be used by a given user in accordance with different embodiments.

Using the embodiment where the number of free allowed threads is the total number of unused threads that may be used by any given subscriber is fifty-percent (50%) and assuming that the total number of subscribers is one thousand (1000) and the total number of threads is one thousand (1000), a given subscriber may be able to use up to five-hundred (500) of the one thousand (1000) threads when they are the only subscriber accessing the system (i.e., where the total number of unused threads is nine-hundred, ninety-nine (999)). One the other end of the spectrum, that same subscriber is only allowed to use one (1) thread where all subscribers are requesting two (2) or more threads (i.e., where the total number of unused threads drops to zero (0)). Thus, any given subscriber is allowed to make a tremendous number of requests when the system is lightly loaded. This is especially useful for automated scripts that run in the middle of the night. At the same time, a significant number of threads are maintained available for requests received from other subscribers. There is some possibility that where a large number of requests from other subscribers are simultaneously received at a time when other subscribers are unfairly granted access to threads that a request from a subscriber that has not even exceeded their fair threads can be rejected. However, such a possibility is remote and resolves as soon as one of the currently executing threads completes.

The number of free allowed threads is added to the number of fair threads to yield a total number of threads that can be concurrently used by a given subscriber at the current time (block 308). Again, as the total number of unused threads varies as a function of the number of threads used by other subscribers, the total number of threads that can be concurrently used by a given subscriber at the current time varies.

Additionally, an authentication process is performed to identify the specific requester (block 310). In some embodiments, this authentication process involves a token lookup using a barer token passed as part of a hypertext transfer protocol (HTTP) header that is translated by an API. In some cases, the identity of the user is resolved with an external lookup to a centralized authentication service. Based upon the disclosure provided herein, one of ordinary skill in the art will recognize a variety of authentication processes that may be used in relation to different embodiments. In addition, the number of concurrent threads currently associated with the specific requester is determined (block 312). In some embodiments, this involves identifying all current threads associated with the token (as in the case of a request including a script of a number of threads), or in the case where a subscriber has used multiple tokens (as in the case where the subscriber has issued a number of separate requests) identifying all current threads associated with a user identified by resolving the multiple tokens. Based upon the disclosure provided herein, one of ordinary skill in the art will recognize a variety of processes that may be used to determine the number of concurrent threads associated with the specific requester.

It is determined whether the identified specific requester is allowed unfair access (block 314). In some embodiments, some subscribers are not allowed unfair access as part of their subscription rights. In such embodiments where the request is being received from such a limited subscriber, the subscriber is not granted access to unused threads (i.e., more than their fair share), and as such it is determined whether the identified requester has already exceeded the number of fair threads per requester (block 324). Where the identified requester has already exceeded the number of fair threads per requester (block 324), the request is denied (block 326).

Otherwise, where the identified requester has not already exceeded the number of fair threads per requester (block 324), the request by the specific subscriber is granted (block 320). As part of granting the request, the request is processed resulting in a response to the specific subscriber. As an example, a request may be for the number of incidents occurring in a network over defined time-frame. Based upon the disclosure provided herein, one of ordinary skill in the art will recognize a variety of requests that may be made in relation to different embodiments. The number of threads concurrently used by the specific subscriber is incremented (block 322).

Alternatively, identified specific requester is allowed unfair access (block 314), the number of concurrent threads associated with the specific requester (block 312) is compared with the total number of threads (block 308) that can be concurrently used by the specific subscriber to determine whether the specific subscriber has exceeded their maximum number of threads (block 316). Where the concurrent threads associated with the specific requester (block 312) has not exceeded the total number of threads (block 308) (block 316), the request by the specific subscriber is granted (block 320), and the number of threads concurrently used by the specific subscriber is incremented (block 322).

Otherwise, where the concurrent threads associated with the specific requester (block 312) has exceeded the total number of threads (block 308)(block 316), the request is denied (block 318).

Similar to that discussed above in relation to FIGS. 2A-2B, such an approach to throttling offers an ability to handle requests from subscribers that were not expected or known prior to receiving the request. The approach of FIG. 3 allows for segregating different classes of subscribers in a way that guarantees a lower class of subscriber is given reasonable access without their ability to substantially diminish the number of free allowed threads, and in that way leaving additional unfair grants for a higher class of subscriber.

Figure 4:
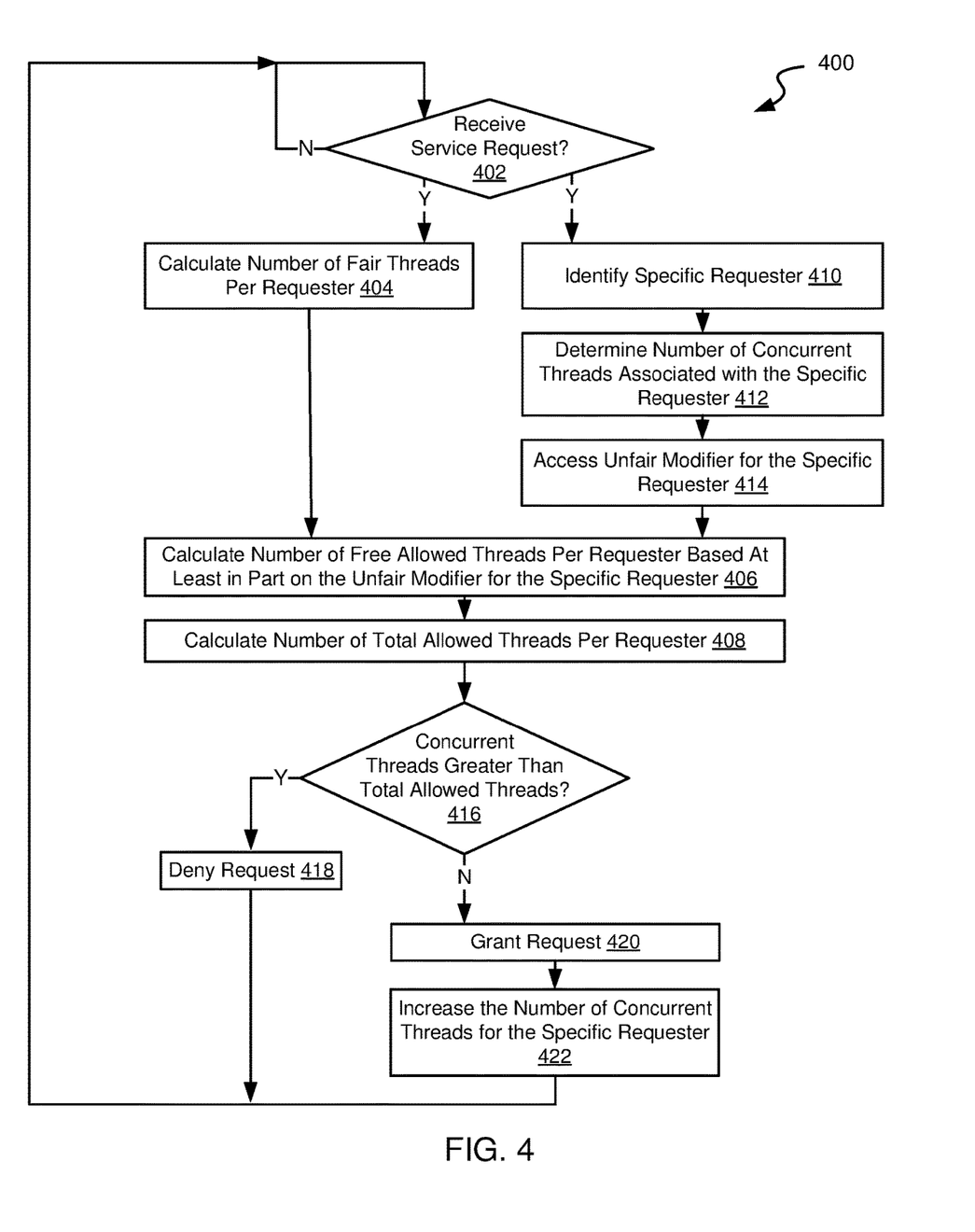
FIG. 4 is a flow diagram showing a method in accordance with other embodiments for servicing requests using yet another unfair throttling approach.

Turning to FIG. 4, a flow diagram 400 shows a method in accordance with yet other embodiments for servicing requests using an unfair throttling approach. Following flow diagram 400, it is determined whether a request has been received (block 4202). In some embodiments, requests are received from subscribers via an API, and determining that such a request has been received involves monitoring network messages for a message that is a request. Based upon the disclosure provided herein, one of ordinary skill in the art will recognize a variety of processes that may be used to receive messages, and corresponding processes for identifying receipt of such messages.

Where a request has been received (block 402), a number of fair threads per requester is calculated (block 404). In some embodiments, the number of fair threads per requester is calculated as the total number of threads that can be concurrently serviced divided by the total number of subscribers.

Additionally, an authentication process is performed to identify the specific requester (block 410). In some embodiments, this authentication process involves a token lookup using a barer token passed as part of a hypertext transfer protocol (HTTP) header that is translated by an API. In some cases, the identity of the user is resolved with an external lookup to a centralized authentication service. Based upon the disclosure provided herein, one of ordinary skill in the art will recognize a variety of authentication processes that may be used in relation to different embodiments. In addition, the number of concurrent threads currently associated with the specific requester is determined (block 412). In some embodiments, this involves identifying all current threads associated with the token (as in the case of a request including a script of a number of threads), or in the case where a subscriber has used multiple tokens (as in the case where the subscriber has issued a number of separate requests) identifying all current threads associated with a user identified by resolving the multiple tokens. Based upon the disclosure provided herein, one of ordinary skill in the art will recognize a variety of processes that may be used to determine the number of concurrent threads associated with the specific requester.

An unfair modifier for the specific requester is accessed (block 414). This modifier is a value that corresponds to a level of service for the subscriber generating the request and defines an amount of unused threads that the subscriber can unfairly use. Where the modifier is zero (0), the subscriber is not allowed to use any threads beyond the number of fair threads per requester and thus the system operates similar to that described above in relation to FIG. 3 where the subscriber is not allowed unfair access. On the other end of the spectrum, where the modifier is one (1), the subscriber is allowed a maximum amount of the number of free allowed threads that are possible to any subscriber (e.g., fifty-percent (50%) of the total number of unused threads).

The number of free allowed threads that may be used by the identified requester is calculated (block 406). In some embodiments, the number of free allowed threads that may be used by the specific subscriber is a function of: how many of the total number of threads that can be concurrently serviced less those threads that are currently used, and the unfair modifier. The number of free allowed threads is the total number of unused threads, which varies over time based upon usage of other subscribers. In one particular embodiment, the number of free allowed threads is the total number of unused threads that may be used by any given subscriber is fifty-five percent (55%) of the total number of unused threads multiplied by the unfair modifier for the specific requester. It is noted that in some embodiments the number of free allowed threads changes each time a request is granted and each time a process corresponding to a request completes, and as such the number of free allowed threads can change tens, hundreds, or more times per second. Based upon the disclosure provided herein, one of ordinary skill in the art will recognize other percentages of the total number of unused threads that may be used by a given user in accordance with different embodiments.

The number of free allowed threads is added to the number of fair threads to yield a total number of threads that can be concurrently used by a given subscriber at the current time (block 408). Again, as the total number of unused threads varies as a function of the number of threads used by other subscribers, the total number of threads that can be concurrently used by a given subscriber at the current time varies.

The number of concurrent threads associated with the specific requester (block 412) is compared with the total number of threads (block 408) that can be concurrently used by the specific subscriber to determine whether the specific subscriber has exceeded their maximum number of threads (block 416). Where the concurrent threads associated with the specific requester (block 412) has not exceeded the total number of threads (block 408)(block 416), the request by the specific subscriber is granted (block 420). The number of threads concurrently used by the specific subscriber is incremented (block 422).

Otherwise, where the concurrent threads associated with the specific requester (block 412) has exceeded the total number of threads (block 408)(block 416), the request is denied (block 416).

Similar to that discussed above in relation to FIGS. 2A-2B, such an approach to throttling offers an ability to handle requests from subscribers that were not expected or known prior to receiving the request. The approach of FIG. 4 allows for segregating different classes of subscribers into any number of categories based upon the value of the unfair modifier assigned to each of the respective subscribers. Such an approach guarantees a lower class of subscriber is given reasonable access, while the ability of any given subscriber to access unused threads is controlled in such a way that a higher class of subscriber can be granted enhanced access to otherwise unused threads.

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A system for providing a network service to a plurality of subscribers, the system comprising:
   a processing resource;
   a non-transitory computer-readable medium, coupled to the processing resource, and having stored therein instructions that when executed by the processing resource cause the processing resource to:
      receive a first request to perform a first network service from a first subscriber at a first time, a second request to perform a second network service from the first subscriber at a second time, and a third request to perform a third network service from a second subscriber at a third time, wherein a rate at which the first request, the second request, and the third request are received is at least ten per second;
      identify the first subscriber and the second subscriber;
      calculate a maximum number of threads usable by the first subscriber corresponding to the first time;
      calculate a maximum number of threads usable by the first subscriber corresponding to the second time;
      calculate a maximum number of threads usable by the second subscriber corresponding to the third time by adding a first variable to a second variable, wherein the first variable varies as a function of a total number of subscribers and the second variable is a total capacity less the total amount of capacity currently used by all of the subscribers multiplied by a first multiplication factor, wherein calculating the maximum number of threads usable by the first subscriber corresponding to the second time comprises adding the first variable to a third variable, representing the total capacity less the total amount of capacity currently used by all of the subscribers multiplied by a second multiplication factor, and wherein the second multiplication factor is different from the first multiplication factor;
      grant the first request based at least in part on the maximum number of threads usable by the first subscriber corresponding to the first time;
      process the first request;
      grant the third request based at least in part on the maximum number of threads usable by the second subscriber corresponding to the third time;
      process the third request; and
      deny the second request based at least in part on the maximum number of threads usable by the first subscriber corresponding to the second time, wherein the maximum number of threads usable by the first subscriber corresponding to the second time is less than the maximum number of threads usable by the first subscriber corresponding to the first time in part because of the grant of the third request.

2. The system of claim 1, wherein processing the first request continues until after processing the third request has completed.

3. The system of claim 1, wherein the first variable is a total amount of capacity divided by the total number of subscribers.

4. A method for providing a network service to a plurality of subscribers, the method comprising:
   receiving, by a processing resource, a first request to perform a first network service from a first subscriber at a first time, a second request to perform a second network service from the first subscriber at a second time, and a third request to perform a third network service from a second subscriber at a third time, wherein a rate at which the first request, the second request, and the third request are received is at least ten per second;
   identifying, by the processing resource, the first subscriber and the second subscriber;
   calculating, by the processing resource, a maximum number of threads usable by the first subscriber corresponding to the first time;
   calculating, by the processing resource, a maximum number of threads usable by the first subscriber corresponding to the second time;

calculating, by the processing resource, a maximum number of threads usable by the second subscriber corresponding to the third time by adding a first variable to a second variable, wherein the first variable varies as a function of a total number of subscribers and the second variable is a total capacity less the total amount of capacity currently used by all of the subscribers multiplied by a first multiplication factor, wherein calculating the maximum number of threads usable by the first subscriber corresponding to the second time comprises adding the first variable to a third variable, representing the total capacity less the total amount of capacity currently used by all of the subscribers multiplied by a second multiplication factor, and wherein the second multiplication factor is different from the first multiplication factor;

granting, by the processing resource, the first request based at least in part on the maximum number of threads usable by the first subscriber corresponding to the first time;

processing, by the processing resource, the first request;

granting, by the processing resource, the third request based at least in part on the maximum number of threads usable by the second subscriber corresponding to the third time;

processing, by the processing resource, the third request; and denying, by the processing resource, the second request based at least in part on the maximum number of threads usable by the first subscriber corresponding to the second time, wherein the maximum number of threads usable by the first subscriber corresponding to the second time is less than the maximum number of threads usable by the first subscriber corresponding to the first time in part because of the grant of the third request.

5. The method of claim 4, wherein processing the first request continues until after processing the third request has completed.

6. The method of claim 4, wherein the first variable is a total amount of capacity divided by the total number of subscribers.

7. The method of claim 4, wherein the second variable is set at zero.

8. A non-transitory computer-readable medium, the non-transitory computer readable medium having stored therein instructions that when executed by a processing resource cause the processing resource to perform a method comprising:

receiving, by a processing resource, a first request to perform a first network service from a first subscriber at a first time, a second request to perform a second network service from the first subscriber at a second time, and a third request to perform a third network service from a second subscriber at a third time, wherein the third time precedes the second time, wherein a rate at which the first request, the second request, and the third request are received is at least ten per second;

identifying the first subscriber and the second subscriber;

calculating a maximum number of threads usable by the first subscriber corresponding to the first time;

calculating a maximum number of threads usable by the first subscriber corresponding to the second time;

calculating a maximum number of threads usable by the second subscriber corresponding to the third time;

granting the first request based at least in part on the maximum number of threads usable by the first subscriber corresponding to the first time;

processing the first request;

granting the third request based at least in part on the maximum number of threads usable by the second subscriber corresponding to the third time by adding a first variable to a second variable, wherein the first variable is a total amount of capacity divided by the total number of subscribers and the second variable is a total capacity less the total amount of capacity currently used by all of the subscribers multiplied by a first multiplication factor, wherein calculating the maximum number of threads usable by the first subscriber corresponding to the second time comprises adding the first variable to a third variable, representing the total capacity less the total amount of capacity currently used by all of the subscribers multiplied by a second multiplication factor, and wherein the second multiplication factor is different from the first multiplication factor;

processing the third request; and denying the second request based at least in part on the maximum number of threads usable by the first subscriber corresponding to the second time, wherein the maximum number of threads usable by the first subscriber corresponding to the second time is less than the maximum number of threads usable by the first subscriber corresponding to the first time in part because of the grant of the third request.

\* \* \* \* \*